US 6,421,660 B1

(12) United States Patent
Glaise (10) Patent No.: US 6,421,660 B1
(45) Date of Patent: Jul. 16, 2002

(54) ENHANCED SEARCHING METHOD AND APPARATUS FOR VARIABLE BIT CHAINS

(75) Inventor: Rene Glaise, Nice (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/216,191

(22) Filed: Dec. 18, 1998

(30) Foreign Application Priority Data

Dec. 19, 1997 (FR) ............................................. 97 480096

(51) Int. Cl.$^7$ ............................................. G06F 17/30
(52) U.S. Cl. ..................... 707/3; 77/6; 77/100; 77/102
(58) Field of Search ........................... 370/60, 389, 392; 707/3, 100, 102, 6

(56) References Cited

U.S. PATENT DOCUMENTS

| 5,546,390 A | * | 8/1996 | Stone ........................... 370/60 |
| 5,787,430 A | * | 7/1998 | Doeringer et al. ........... 707/100 |
| 5,946,679 A | * | 8/1999 | Ahuja et al. .................... 707/3 |
| 6,011,795 A | * | 1/2000 | Varghese et al. ............. 370/392 |
| 6,012,061 A | * | 1/2000 | Sharma ....................... 707/100 |
| 6,041,053 A | * | 3/2000 | Douceur et al. ............. 370/389 |
| 6,061,679 A | * | 5/2000 | Bournas et al. ................. 707/3 |
| 6,223,172 B1 | * | 4/2001 | Hunter et al. ................... 707/3 |

FOREIGN PATENT DOCUMENTS

WO          9600945          6/1996

OTHER PUBLICATIONS

Sedgewick, "Algorithms", Addison–Wesley Publishing Company, 1983, pp. 219–223.*
Doeringer et al., "Rounting on Longest–Matching Prefixes", 1996, IEEE, pp. 86–97.*
Shishibori et al., "An Efficient Compression Method for Patricia Tries", 1997, IEEE, pp. 415–420.*
Shishibori et al., "A Key Search Algorithm Using the Compact Patricia Trie", 1997, IEEE, pp. 1581–1584.*
IEEE/ACM Transactions on Networking, vol. 4, No. 1, Feb., 1996.

* cited by examiner

Primary Examiner—Safet Metjahic
Assistant Examiner—Thuy N. Pardo
(74) Attorney, Agent, or Firm—Jerry W. Herndon (57) ABSTRACT

The present method and apparatus provide a searching operation of variable bit chain keys, the implementation being possible in software and cost effective in hardware. When implemented in the network routers, this solution sustains performance required for routing IPV4 OR IPV6 datagrams node insert and delete operations maintain the data base with no need for further garbage collection. The Extended patricia tree data structure of the invention the determination in advance of the process time and the storage resources which will be used. Variable bit chain keys padded with zeros and their prefix length are stored in the extended patricia tree. A search is performed in two parts, a first up-down displacement in the tree followed by a down-up displacement to find the key stored in one node in the tree having the longest matching prefix with the key to be searched.

5 Claims, 8 Drawing Sheets

FIG. 1

| EXAMPLE OF A REGULAR PATRICIA TREE |
|---|

Node Keys in Hexadecimal Notation

FIG. 2

EXAMPLE OF AN EXTENDED PATRICIA TREE

Node Keys in Hexadecimal Notation

FIG. 3

| BINARY FORM OF THE 15 KEYS, PREFIX LENGTHS AND NODE TESTED BITS (0 or 1) | | | |
|---|---|---|---|
| ⊢—L=8—⊣<br>x'01'=b'0000000<u>1</u>' | ⊢—L=5—⊣<br>x'08'=b'00001000' | ⊢—L=7—⊣<br>x'0E'=b'0000111<u>0</u>' | ⊢—L=7—⊣<br>x'14'=b'0001010<u>0</u>' |
| ⊢—L=8—⊣<br>x'03'=b'000000<u>1</u>1' | ⊢—L=8—⊣<br>x'09'=b'0000100<u>1</u>' | ⊢L=4⊣<br>x'10'=b'000<u>1</u>0000' | ⊢L=5⊣<br>x'18'=b'0001<u>1</u>000' |
| ⊢—L=8—⊣<br>x'05'=b'0000010<u>1</u>' | ⊢—L=6—⊣<br>x'0C'=b'00001<u>1</u>00' | ⊢—L=7—⊣<br>x'12'=b'0001001<u>0</u>' | ⊢—L=7—⊣<br>x'1A'=b'0001101<u>0</u>' |
| ⊢—L=8—⊣<br>x'07'=b'0000011<u>1</u>' | ⊢—L=8—⊣<br>x'0D'=b'0000110<u>1</u>' | ⊢—L=8—⊣<br>x'13'=b'0001001<u>1</u>' | |

FIG. 5

(*) THERE IS NO DIFFERENTIATING 1's BETWEEN TWO PREFIXES OF DIFFERENT LENGTHS

ENHANCED SEARCHING METHOD AND APPARATUS FOR VARIABLE BIT CHAINS

BACKGROUND OF THE INVENTION

This invention relates to a method and an apparatus for searching variable bit chains in storage; this invention can be used in high speed networks for routing IPV4 or IPV6 (Internet Protocol Version 4 and Internet Protocol Version 6) datagrams which requires searching in a routing table for the longest matching prefix of a variable bit chain address. This process has been recommended for IP datagram address routing by the IETF organization (Internet Engineering Task Force) on the basis of the 'Classless Inter-Domain Routing' (CIDR) adopted as RFC-1466 in May, 1993. It needs to be implemented, for instance, in network routers which have also to sustain higher and higher media speed lines in the current networking environment.

One conventional way of sustaining media speed for searching large bit chains is a hardware assist based on a CAM (Content Addressable Memory) hardware device. The CAM components are available in the networking industry and operable as follows: a key is given as input and the result of the search is provided in a time quite convenient for high speed IP datagram processing. However, to find the longest matching prefix of a bit chain address, the CAM user has to implement many masks which need to be applied to the CAM entries. Both processing and storage requirements in such devices are severely impacted by this usage of masks. Consequently, the use of CAM is generally too expensive for networking equipment.

One other solution to have an efficient searching function is to use a binary tree data base structure. A problem of the binary trees is that they are difficult to manage, the delete and insert entry operations being much too complex. Radix tries, providing a per bit test are well adapted to variable bit chain searching. In the IBM PCT international filing WO 96/00945 dated Jun. 30, 1996 and the publication 'IEEE/ACM transactions on networking', Vol. 4, No. 1, dated February 1996, the article of Willibad Doeringer, Günter Karjoth and Mehdi Nassehi discloses dynamic prefix tries for longest matching prefix search. Searching based on the longest matching prefix is required in network equipment for IP datagram routing: the IPV4 address which is read in the router is 32 bits long. A search is performed in the routing table to find the address having the longest bit chain part in common with the IP address. One advantage of the solution described in the IEEE article is to provide a maintenance of the data structure; however, even if logically entries can be suppressed in the trie, a garbage collection has to be applied to the trie to clean up old node storage areas. Furthermore, this solution is rather software oriented: no simple and inexpensive hardware implementation is considered. One other problem is that the storage space for each node of the trie is not foreseeable as well as the displacement for searching in the trie. These two parameters have a direct impact of the amount of storage and processing time which cannot be foreseen.

It is therefore an object of the present invention to have a corresponding apparatus for searching the longest matching prefix of variable bit chains in a table having bit chain entries.

It is a second object of the invention to have a simple and limited cost oriented hardware implementation of the solution.

It is one other object of the invention to provide a method for inserting and deleting data entries without any need for further garbage collection.

Finally, it is also an object of the invention to have a deterministic knowledge of storage used and processing time required for searching.

SUMMARY OF THE INVENTION

In brief, this object is achieved by a method for searching input variable bit chain keys having a maximum length value in a patricia tree based data base, each node in the data base storing a direct parent address pointing to a previous node, two addresses pointing to following nodes, a data value or a pointer to a data value, a bit chain key zero padded up to said maximum length value, the length of said key and the rank of a bit to be tested at this node in the input key; said method comprising the steps of:

A. pointing to the root node of the tree,
B. padding the input key with zeros up to the maximum length value and reading the bit to test in the input key and according to the value of the bit to test pointing to the following node address,
C. repeating step B and reaching the following nodes until the rank of the bit to test of a following node is equal to or greater than the rank of the bit to test of the previous rank,
D. comparing the key stored in said previous node on its stored length with the zero padded input key,
E. if a match is not found, pointing to the parent node using the direct parent address,
F. repeating step E until the root is reached or a match is found,
G. reading the pointer or the data value of said previous node.

The invention further enables insertion operations of the input variable bit chain keys in the data base by extending the searching method with the following steps:

1. performing the searching steps according to the searching method of the invention up to step C,
2. comparing the key length of the just reached node with the length key of its parent node,
3. if the length of the parent node key is smaller than the length of the key to be inserted, comparing the key of the just reached node on its key length with the key of its parent node,
4. if a match is found swapping the two key values between the just reached node and its parent node while restoring the node branching;
5. repeating steps 2 to 4 until the root is reached.

The invention also enables deletion operations of the input variable bit chain keys in the data base by extending the searching method with the following steps:

I. performing the searching steps according to the searching method of the invention up to step C,
II. comparing the key in the previous node on the maximum length value with the zero padded input key,
III. if a match is found, swapping the key read in the following node and the key read in the previous node between the following node read and the previous node read while restoring the node branching, and
IV. suppressing the previous node read by updating its following node.

Also provided is an extended patricia tree data base for storing variable bit chain keys having a maximum length value, each node in the data base storing a direct parent address pointing to a previous node, two following node addresses, a data value or a pointer to a data value, a bit chain key zero padded up to said maximum length value, the rank of a bit to be tested at this node in the input key and the length of said key, the key length stored in one node being always greater than the one stored in a parent node if a match is found when comparing the key in said one node on its key length with the key of the parent node.

The invention provides a searching apparatus for searching variable bit chain keys having a maximum length in a patricia tree based data base, said apparatus comprising:

a processor interface for receiving from a processor acting as a controlling device, a searching request and a variable bit chain input key zero padded up to the maximum length,     a state machine for starting the search operation when receiving signals and data through the processor interface,     an internal storage repetitively accessed by said state machine through a multiplexor and adder, for reading a current node in the tree, starting from the root,     first testing means for testing the bit to test in the input key and thus defining the next node to be accessed,     means for advising the state machine that the following node has to be accessed only if the rank of the bit to test in the current node is smaller than the rank in the previous node,     means for comparing on the key length stored in the previous node the input key and the key stored in the previous node, only if the rank of the bit to test in the current node is equal to or greater than the rank in the previous node, said means further advising the state machine either that the search is completed if a match is found, or that the direct parent node has to be accessed up to the root.

According to the invention, the searching apparatus may be extended to insert and delete nodes in the Extended patricia tree data base of the invention, said apparatus further comprising in its internal storage a last in-last out stack having pointers to the spare node slots of the data base in the internal storage, said stack being updated by the state machine at the end of each successful insert and delete operation.

Also provided is a network routing equipment comprising network input line interfaces for receiving packets arriving at media speed on input lines, a processor for reading in each packet from the network line the bit chain destination address and sending the bit chain to a searching apparatus which gives back a pointer to the processor, a storage unit comprising a routing table from which said processor fetches an output line identifier using said pointer, output lines, a read packet being sent onto the output line corresponding to the fetched identifier.

The solution of the invention, while taking all the advantages of the patricia tree data structure considering that processing time and storage resources are foreseeable, allows, contrary to patricia trees, with the use of zero padded key+prefix length storing, that one key may be the prefix of one other key and that it applies to variable length keys. Furthermore, the solution provides some improvements such as an additional delete operation which does not require that a garbage collection software program be run for data base maintenance. This solution leads to an easy hardware implementation while sustaining, for instance, the performance required for the longest matching prefix searches required in the high speed network equipment routing IPV4 OR IPV6 datagrams.

BRIEF DESCRIPTION OF THE DRAWINGS

The foregoing and other objects, aspects and advantages will be better understood from the following detailed description of a preferred embodiment of the invention with reference to the drawings in which.

DETAILED DESCRIPTION OF THE PREFERRED EMBODIMENT

Figure 1:
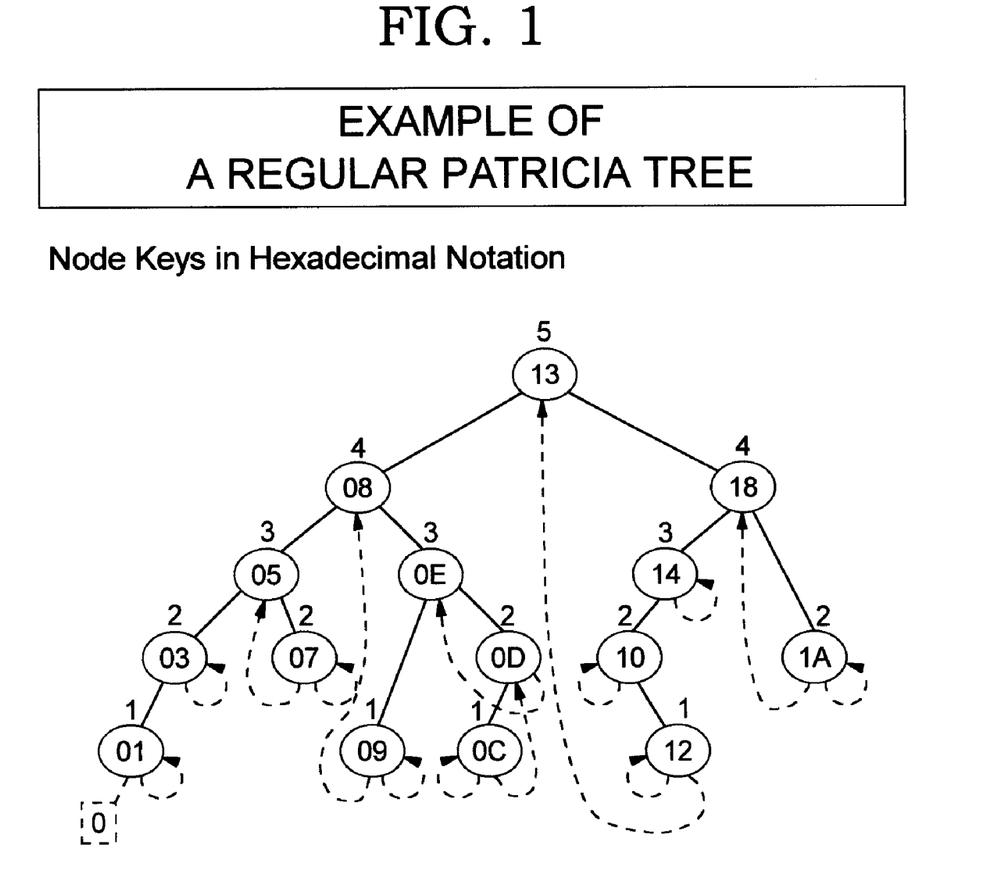
FIG. 1 shows a logical view of a Patricia tree as known from prior art.

Referring to FIG. 1, there is shown a logical view of a data base organized as a Patricia tree known from the prior art, which will be called a 'Regular Patricia tree', as opposed to the 'Extended Patricia' tree according to the invention. To make this preferred embodiment close to the domain of network addresses, the nodes of the Patricia tree of FIG. 1 store 8-bit chain keys represented by two hexadecimal values between 00 and FF instead of 5-bit chain keys represented by an alphabetic letter as illustrated in the example of Patricia tree provided by R. Sedgewick, in the second edition of 'Algorithms', Addison-Wesley, 1988. In FIG. 1, the nodes are represented with circles and the hexadecimal representation of the 8-bit chain key associated with each node is written inside the circle. Over each circle is indicated the key bit which is tested in said node (key bits are numbered right to left starting from 1). The nodes are hierarchically organized, the root node having the key 13 and indicating that bit 5 is to be tested. In the following hierarchical level, a lower bit number is tested and so on (i.e. from left to right) up to the end of each branch of the tree.

Searching of a Regular Patricia tree starts from the root node in FIG. 1 containing key 13. Then, if bit 5 of the input key is a 0, the next node to visit is the one immediately down to the left of the root (08). On the contrary, if bit 5 of input key is a 1 this is the node immediately down to the right which must next be visited (18). At each visited node the same process applies again thus permitting to move further down the tree depending upon the input key values tested at each node. A regular search eventually ends when a node references itself as a child node or a node at a higher level of the tree. In FIG. 1, such references are indicated by the dotted lines.

In a Regular Patricia tree, the node pointed to when the search terminates is the only node that may possible contain the searched key. A key comparison is then performed (the only one needed for a regular search). Input and stored node keys may or may not match exactly. If a partial match is found, the longest-match (from left to right) has been found for the input key within the set of stored keys present in the tree. This is generally considered as one of the chief advantages of such structures (i.e. Patricia and radix tries) to return the longest match found rather than a straight nomatch indication as it is often the case with other search methods.

Another well known advantage, that is a distinctive feature of a Patricia tree, is that there is one node, and only one, per stored key. Thus, being given the maximum number of keys the search device has to manipulate, the storage required to build such a tree is exactly known in advance. Consequently, a search need not go through dummy nodes to reach the node containing the information as is often the case in other trees.

As an example of searches in the tree of FIG. 1, if input key 10 is searched, the operation ends obviously at node 10 after having gone through nodes 13, 18, 14 and 10. This latter node references itself when bit 2 is tested. At this node 10 (the last node pointed to), a full match is found between stored and input keys. If, on the contrary, a key like 15 is searched, this ends up at node 14 where bit 3 is tested for one. Then, a partial match only is found on seven of the bits from left to right (only bit 1 of the keys differ). Thus, the longest-match is found among all the keys stored in the tree.

All searches in a Patricia tree end up at a node containing a key except the special case of the all-zero tested bit key. In FIG. 1 this ends up at node 01 branching to '0' since bit 1 is tested to 0. This is a 'no-branching' which also terminates the search.

Insertion of new nodes (and keys) into a Regular Patricia tree is a well known process of the prior art. This can only be achieved on tree branches where there are 'holes' in the bit to test. For instance, between nodes 18 and 1A a new node can be inserted where bit 3 would be tested. This happens if keys like 1C, 1D, 1E or 1F have to be inserted. Another mode of insertion may occur more likely at the periphery of the tree, like after node 07 or 1A or before the root if a key as 27 must be handled.

However, deletion of nodes from a Patricia tree is not known in the prior art, in the general case. If deleting a node at the periphery of the tree, like 12, is obvious, no means has been described to remove a node like 08 branching to two other nodes.

Figure 2:
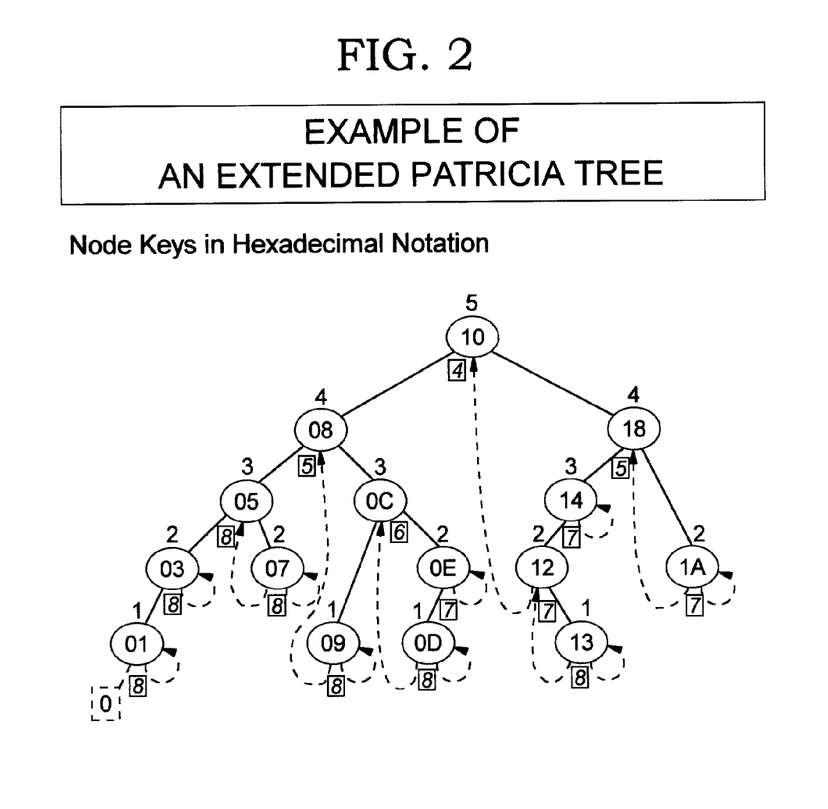
FIG. 2 illustrates a logical view of an Extended Patricia tree according to the invention.

FIG. 2 is a logical view of an Extended Patricia tree according to the invention. In the preferred embodiment illustrated in FIG. 2, the nodes of the Patricia tree store 8-bit chain keys represented by two hexadecimal characters encompassing 256 possible values ranging from 00 to FF. The input key to be searched is a variable length key whose maximum value of its hexadecimal representation is FF and its binary representation is a chain of 8 significant bits. Each variable length key has a binary representation comprising a chain of L significant bits which is the bit length of the key. Variable length keys are stored in the Extended Patricia tree as a 8-bit chain comprising, from left to right, the binary representation of the variable length bit chain of length L completed with padding of 0 bits up to 8 bits. A key stored in the Extended Patricia tree of FIG. 2 comprises the significant bit chain which is called the prefix and the zero padding up to 8 bits from left to right. In the nodes of the Extended Patricia tree, two keys cannot differ by their L value. In FIG. 2 each node is represented with a circle including one hexadecimal representation of a zero right padded variable length stored key. Over each circle is indicated the key bit which must be tested in said node (key bits are numbered right to left starting from 1). Under each circle is indicated the length L of the chain of significant bits of the binary representation of the stored key, that is the length of the key prefix.

Figure 3:
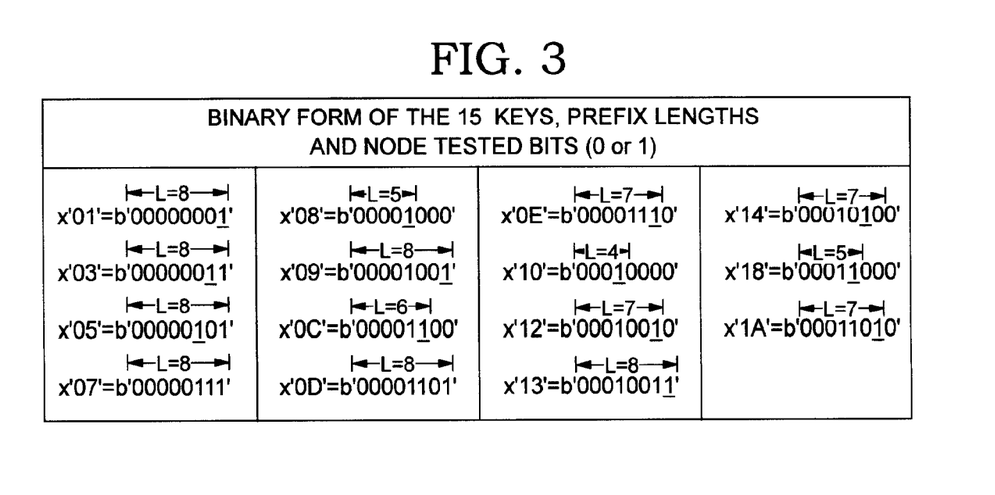
FIG. 3 shows all the key hexadecimal and binary representations and the prefix lengths L of Extended Patricia tree of FIG. 2.

FIG. 3 is an hexadecimal and binary representation of the 15 keys of the Extended Patricia tree of FIG. 2. Above each binary representation of a key the prefix length is indicated. For example, the prefix length of the x'10' key is 4. In FIG. 3, each binary representation of a key comprises an underscored bit which is the bit to test for the corresponding node.

Coming back to FIG. 2, the dotted arrow lines, like in a Regular Patricia tree, end a search and point to the only node that may better match the input key on the highest number of bits from left to right. However, because the prefix length is also specified at each node of an Extended Patricia tree, the stored and input keys must match exactly, from left to right on (at least) the number of bits specified by the bottom number of the node (i.e. it must match exactly the prefix length to consider that the search is successful.) If not, the extended search proceeds with the parent node and key until a prefix matches exactly the input key or because the root is reached, in which case the extended search is unsuccessful. It is the chief property of an Extended Patricia tree to have, in all paths, shorter prefixes closer to the root. The longest-matching prefix of an input key is always found first when moving upwards to the root after a regular search has terminated at the only node that may possibly contain the better match of the input key. As an example to illustrate this, regular searching of input key 15 in tree of FIG. 2 ends up at node 14 which is also the end of the extended search since both keys match exactly on 7 bits as required by the prefix length specified for this particular node (bottom node number). However, regular searching of input key 16 which also ends at node 14, does not end the Extended search because both keys do not match exactly on 7 bits in this case. Then, the extended search proceeds with parent node 18 (which does not match on five bits) and finishes successfully at node 10. Keys being each other prefixes can coexist in the same extended patricia tree. An input key extended search always returns the longest-prefix. There is one exception, which is the case of prefixes only differing by their prefix lengths.

In other words if prefixes like 10/4, 18/5 and 1A/7 (prefix+padding/prefix_length) which are indeed each other prefixes can coexist in the tree of FIG. 2, it is not possible to handle simultaneously other prefixes like 10/5 or 18/6, which only differ by their prefix length from the other keys already present in the tree.

Figure 4:
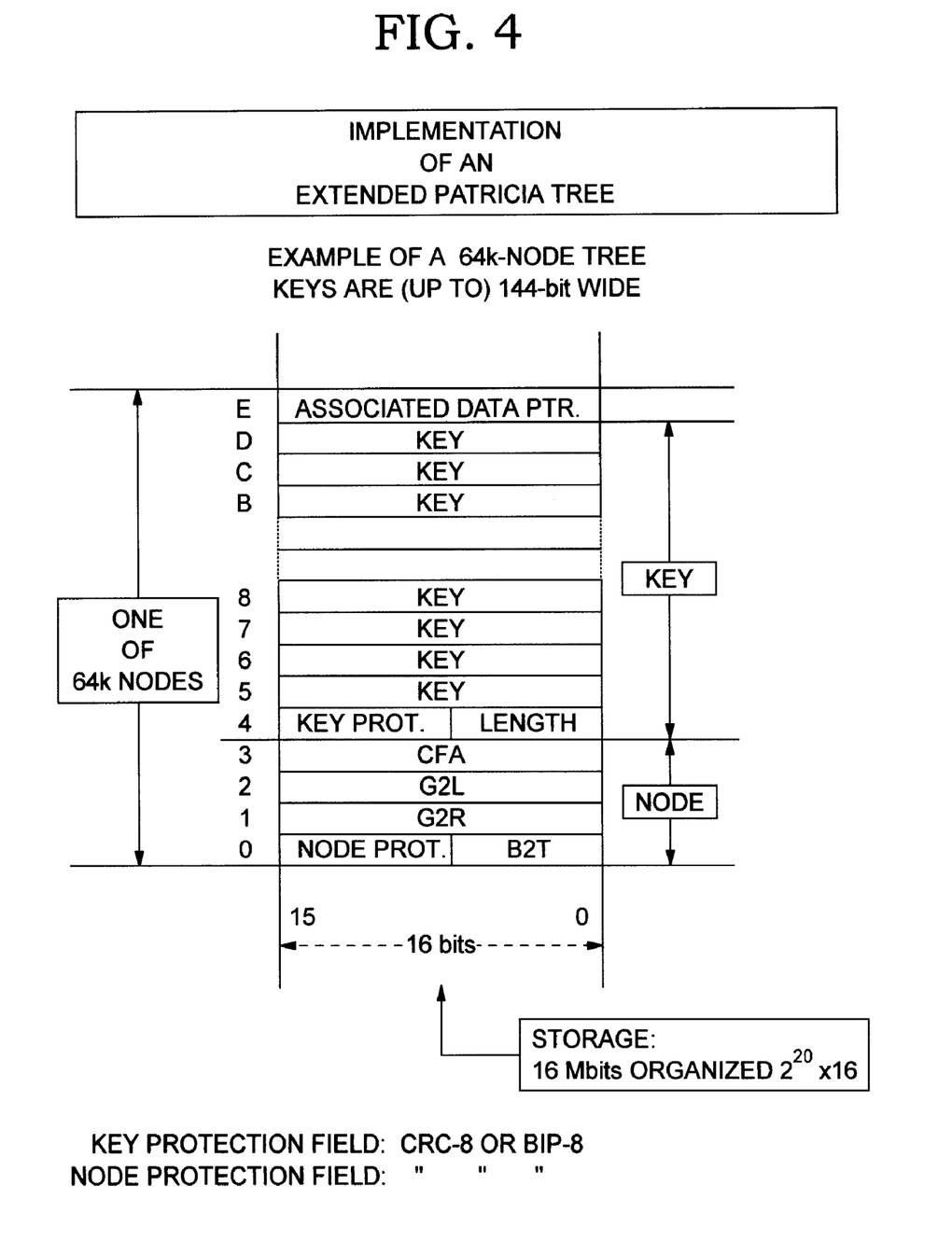
FIG. 4 shows the data stored in a node of the Extended Patricia tree according to the invention.

FIG. 4 shows data stored in a data base organized as an Extended Patricia tree. Each storing area, which is a node of the tree, comprises the nearest parent node address (Coming_From_Address or CFA), the input key bit to test when node is visited (Bit_to_Test or B2T), the next node address if tested bit is a 1 (Going_to_right address or G2R) and the next node address if bit is a 0 (Going_to_Left address or G2L). Each node comprises also the key and the prefix length L of the key (thus forming the prefix) or alternatively a pointer to these two values. The key and prefix length L are retrieved once a regular search has reached the last node where a key comparison is needed or because an extended search (requiring a key comparison at each visited node). Because the tree has exactly as many nodes as stored keys, if the area where the keys and prefix lengths are stored is chosen to be different from where nodes are stored, they may however implicitly reference each other thus avoiding the use of an extra pointer. On the contrary an associated data pointer will generally be present and passed to the interrogating device, so that it may reference its own data base when a key matching is found. As an example in the field of telecommunications and networking, the associated node data is everything necessary to forward a message (or a piece of) to its next destination and how it must be handled (priority, class of service etc . . . ). In the preferred embodiment shown in FIG. 4, a key is stored next to the node so that the information is retrieved in burst mode of various lengths. This is convenient to do with the most recent storing devices like the Synchronous Dynamic or Static Random Access Memories (SDRAM). A node is referenced by a 16-bit pointer in the example of FIG. 4 and returned as a response to the interrogating device upon completion of a successful search.

Figure 5:
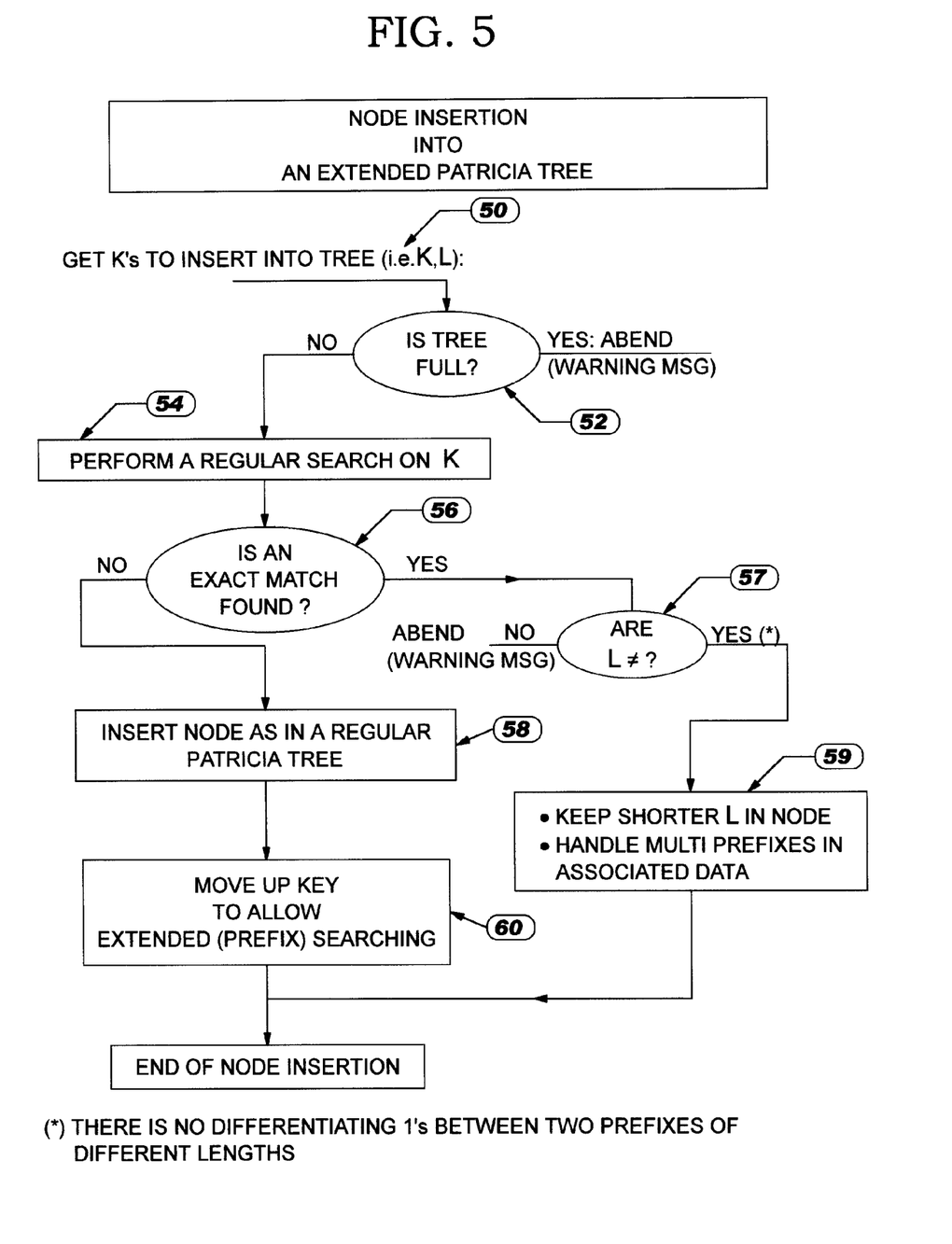
FIG. 5 is a flow chart of the method for inserting a key in an Extended Patricia tree according to the invention.

FIG. 5 is the flow chart of the method for inserting a key in the data base. First step (50) is for getting an input key K of prefix length L to be added to the tree. If the answer to the test 'is the tree full?' (52) is YES, the insertion is abandoned. If the answer is NO, a regular search of the tree (54) is performed as described with FIG. 1. Because, in step 54, a regular search only is performed, the prefix length is ignored. The result of the search is the node where the longest match is found between the input key to be inserted and the stored key. If the answer to the test 'is an exact match found' (56) is YES, the prefix length must then be compared. If the answer to the test 'are L different' (57) is NO, the insertion is abandoned because the exact same key to be inserted is already in the data base. If however the prefix length L are different and answer is YES at step 57, this is indicative of the fact that the two keys (the stored key and the new key to insert) only differ by their prefix length while the padded prefix are identical. Then, this must be treated on an exception basis since no two keys differing only by their prefix length may coexist in the same tree. In the preferred embodiment of the invention, at step 59, the shorter prefix length is kept within the node tree so as to be able to later retrieve all prefixes, everything else within node being unchanged. While extended searches are conducted, the interrogating device will be returned the associated data pointer already mentioned in FIG. 4 and the actual length on which input key match so that it is easy to differentiate between several prefixes having no differentiating ones whenever it is necessary to handle this case. If the answer to step 56 is NO, a new node must be inserted. The operation (58) is first conducted as in a regular Patricia tree. This is well known from the prior art and is briefly described with FIG. 1. Step 58 is immediately followed by a 'move-up' operation (60) during which all keys from the new inserted node towards the root are examined and rearranged so as, in any path, the shorter the prefix the closer they are to the root. Step 60, further described in FIG. 6, is essential to allow all subsequent extended searches to be successful thus always returning the longest-matching prefix of any input key.

Figure 6:
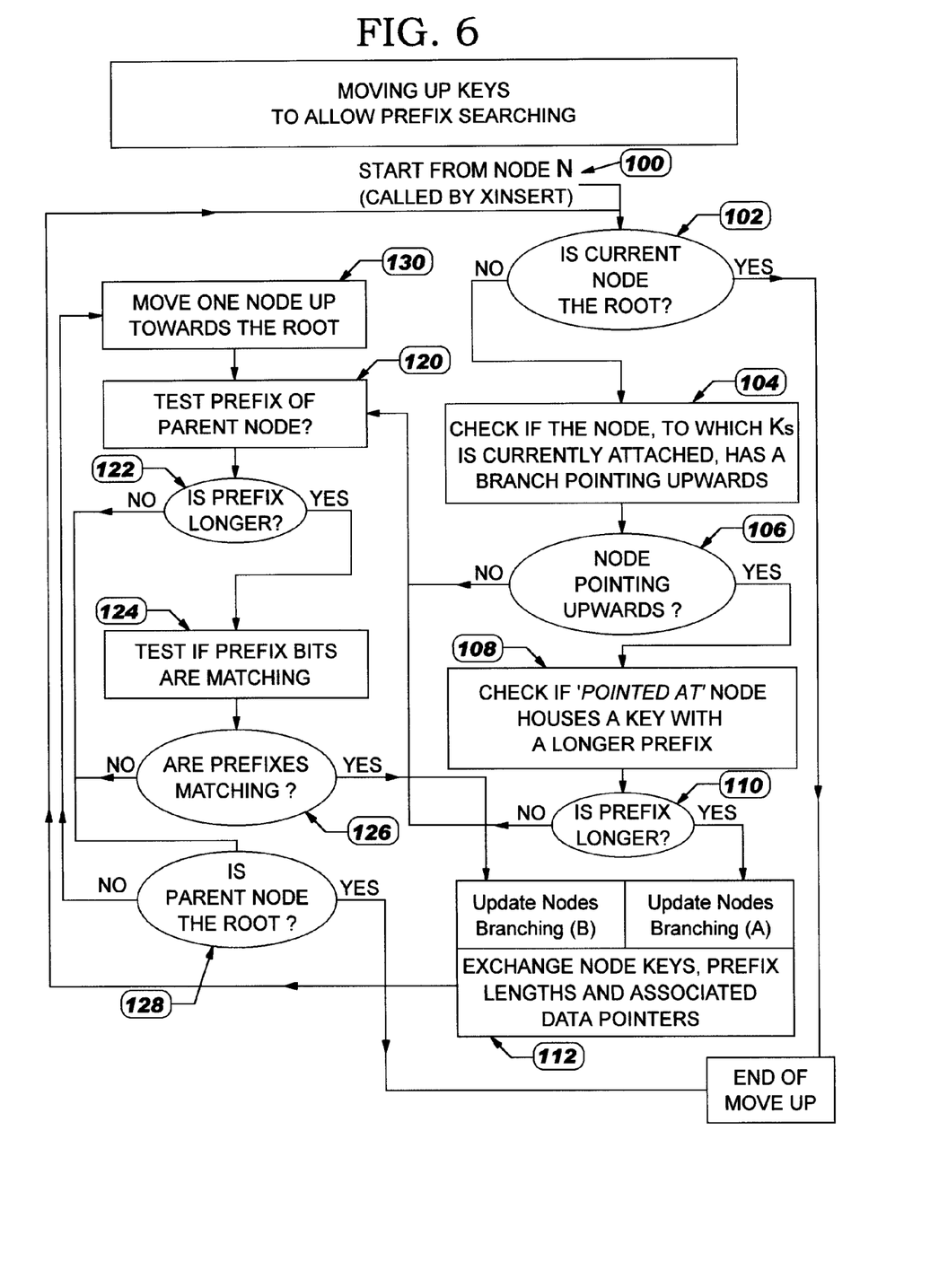
FIG. 6 is a flow chart of the 'move up' operation of the method for inserting a key in an Extended Patricia tree according to the invention.

FIG. 6 is the flow chart of the operation which consists in moving up a key to its optimal position after a regular insertion has been done to allow prefix searching. First step (100) is when the move-up operation is called at completion of step 58 of FIG. 5, already described, which consists in a node insertion as in regular Patricia tree. If the answer to the test 102 'is current node the root?' is YES, no attempt is done to move the key upwards for the obvious reason that the root node is at the top of the tree and process exits immediately. If the answer is NO, at step 104 the inserted node to which the key is currently attached is checked for an upward pointing pointer. If the answer to the test 106 'is node pointing upwards' is YES then the two nodes, namely the current node and the 'pointing at' node, may have their keys exchanged provided it is necessary to do it i.e. if the 'pointed at' node houses a key with a longer prefix. This is checked at step 108 where the respective keys are compared in terms of prefix lengths. If the answer to the test 110 'is prefix longer' is YES then one proceeds with key exchanges, at step 112, between the two nodes. This assumes that the prefix lengths and associated data pointer are also exchanged. Also, node branches are affected by the key swapping and must be altered to reflect the exchange so as to keep the tree consistent. Coming from step 110 the node branching updating (A type) affects the current node which now points to itself (while it used to point to the 'pointed at' node and the node that was referencing the current node must be updated to reference the 'pointed at' node instead. No other change is necessary. At completion of step 112, the process unconditionally resumes at step 102 already described. If the answers to either test 106 or 110 is NO then the parent node of the current node is examined. A test of the attached key is performed at step 120 that compares the current node key to its parent node key. If the answer to the test 122 'is prefix longer' is YES further testing is necessary and done at step 124 which checks if the bits comprised between the 'bit to test' of the two respective nodes are identical. If answer to test 126 is YES then key exchange is possible and done as previously described at step 112. The only change is that the node branching updating (type B) is slightly different. In this case these are the two nodes referencing the current node and its parent node which must have their branching updated (rather than the current node itself and the node referencing it). If the answer to either test 122 or 126 is NO then test 128 is performed. If answer to test 'is parent node the root' is YES then the move-up operation finishes. If the answer is NO then the process continues at step 130 by moving one node up towards the root and resume at step 120 already described. The process ends only when the root is eventually reached.

Figure 7:
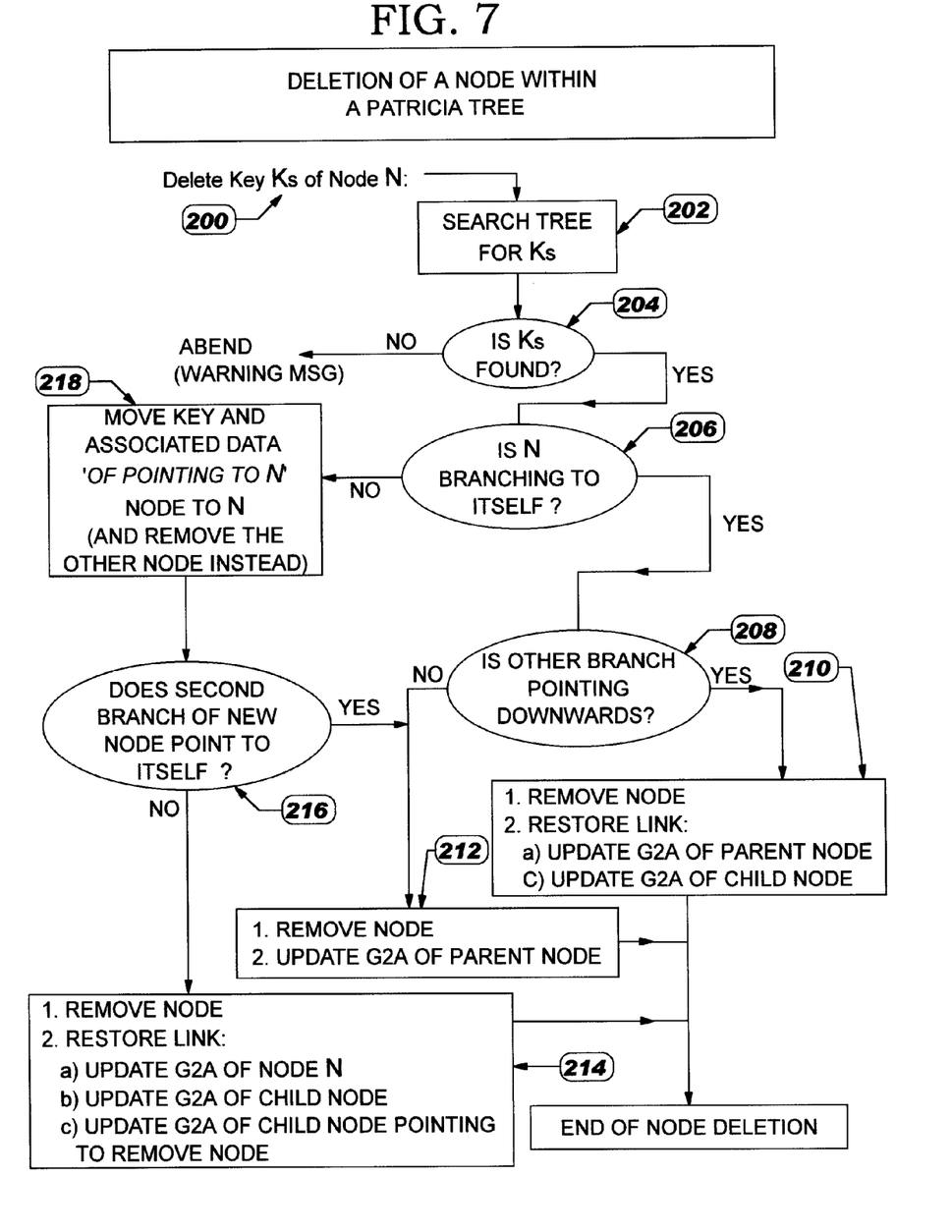
FIG. 7 is a flow chart of the method for deleting a key from an Extended or Regular Patricia tree according to the invention.

FIG. 7: is the flow chart of the method for deleting a key from the tree. This operation, not known from the prior art, is essential to be able to update the tree and to restore it as if the key has never been present. In telecommunications applications, towards which the preferred embodiment of the invention is oriented, the constant evolution of networks over time assumes that new keys are constantly added while others are removed when the corresponding connections or links are no longer active. Deletion of a key as described in FIG. 7 applies to both a Regular or Extended Patricia tree. The deletion of a node and attached key does not take into consideration the prefix length. Deletion starts at step 200 where the key to remove is obtained from the controlling device. The key to delete, right padded with zeros up to the maximum key length must be searched for within the tree. A regular search is then performed at step 202. If the result of the test 204 'is Ks found' is NO then operation ends immediately since the key to remove cannot be found within the tree. If the answer is YES, the next step (206) tests if the node to which the key to remove is attached is a self branching node. If answer to the question 'is node branching to itself' is YES then the next step (208) consists in testing if the other branch of the node is pointing downwards. If the answer to the question 'is other branch pointing downwards' is YES a simple first type of node deletion can be performed at step 210. The node is removed and the broken link is restored between the parent node and the child node of the removed node to keep coherency of the tree. If the answer to test 208 (is other branch pointing downwards?) is NO, deletion operation proceeds to step 212 where the node is removed while only the branching of the parent node must be updated in this even simpler case. If the answer to test 206 (is node branching to itself?) is NO, the delete operation moves on to step 218 where the key to remove and the key of the node pointing to the node housing the key to remove are exchanged. After key exchange, the deletion process proceeds to test 216 'does second branch of new node point to itself'. The "new" node is the node containing the key to be deleted after the key exchange. If answer to this question is YES the node and the attached key can be removed in step 212 already described. If the answer to test 216 is NO the node can be removed as in step 214. The broken link must restored by updating the going_to branching of node which used to contain the key to delete. Also the coming_from address of child node and its going_to address, pointing to the removed node, must be altered to restore the tree structure. Deletion leaves the tree as it would have been built without the removed key.

Figure 8:
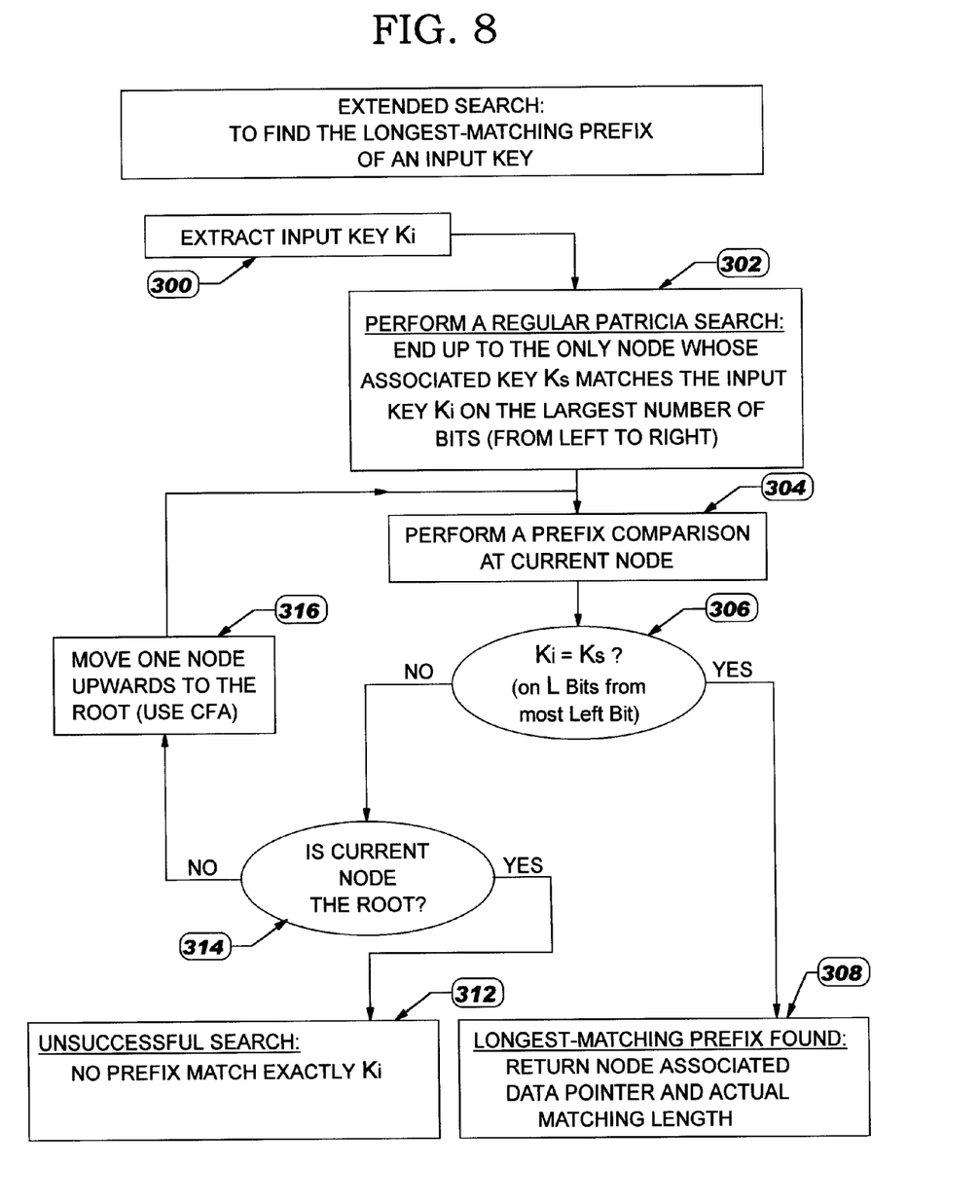
FIG. 8 is a flow chart describing the searching method according to the invention.

FIG. 8: is the flow chart of the method for performing an extended search. This operation, not known from the prior art, is made possible in an extended tree because the keys are rearranged between nodes so that the ones having shorter prefixes are closer to the root in any of the search path. Because the Extended Patricia tree has all the properties of a Regular Patricia tree extended search starts with a regular search which is well known from the prior art and was briefly reminded with FIG. 1. Thus, referring to FIG. 8, extended search starts at step 300 where the input key is obtained from the controlling device. In the field of telecommunications typically this has been extracted from the header of an incoming message (or part of) arriving at a node of a network for the purpose of determining what is its next destination and more generally how it should be handled. As mentioned above the next step (302) consists in performing a regular search with the extracted input key left-right padded with zero's to match the actual implementation of the search device. This is done regardless of the prefix length, specified at each node, like in a regular tree. This first step ends at the only node that houses a stored key matching the input key on most bits from left to right. Then, extended search starts, from this node, at step 304 by comparing stored and input (searched) key on the number of bits from left to right specified by the prefix length attached to the node. If, indeed, both keys match exactly on L bits as tested at step 306 then, regular and extended searches agree and extended search operation may proceed with step 308 where node associated data is retrieved under the form of a pointer passed to the controlling device in charge of handling the incoming message. As mentioned with FIG. 5, in a preferred embodiment of the invention, at this point, the controlling device will also be returned the actual number of bits, from left to right, on which the two keys agree (this may be larger than the prefix length) so as it may very easily handled the case of prefixes only differing by their length while they have no differentiating one's since no two such keys may coexist into the same extended tree. However, if the answer to test 306 is NO then extended search must go on by moving to the parent node unless the current node is already the root of the tree. This is tested at step 314. If answer to this test is YES Extended search is over. The next step (312) consists in passing to the controlling device the information that the extended search was unsuccessful: no prefix matching the input key was found within the tree. If answer to test 314 is NO operation continues with the parent node key. At step 316 parent node found from the 'coming from address' field of the current node is made the current node and extended search resumes at step 306 already described. The loop continues until a (shorter) prefix length is found and process ends at step 308 or stops because the root of the tree is reached and extended search terminates unsuccessfully at step 312.

Figure 9:
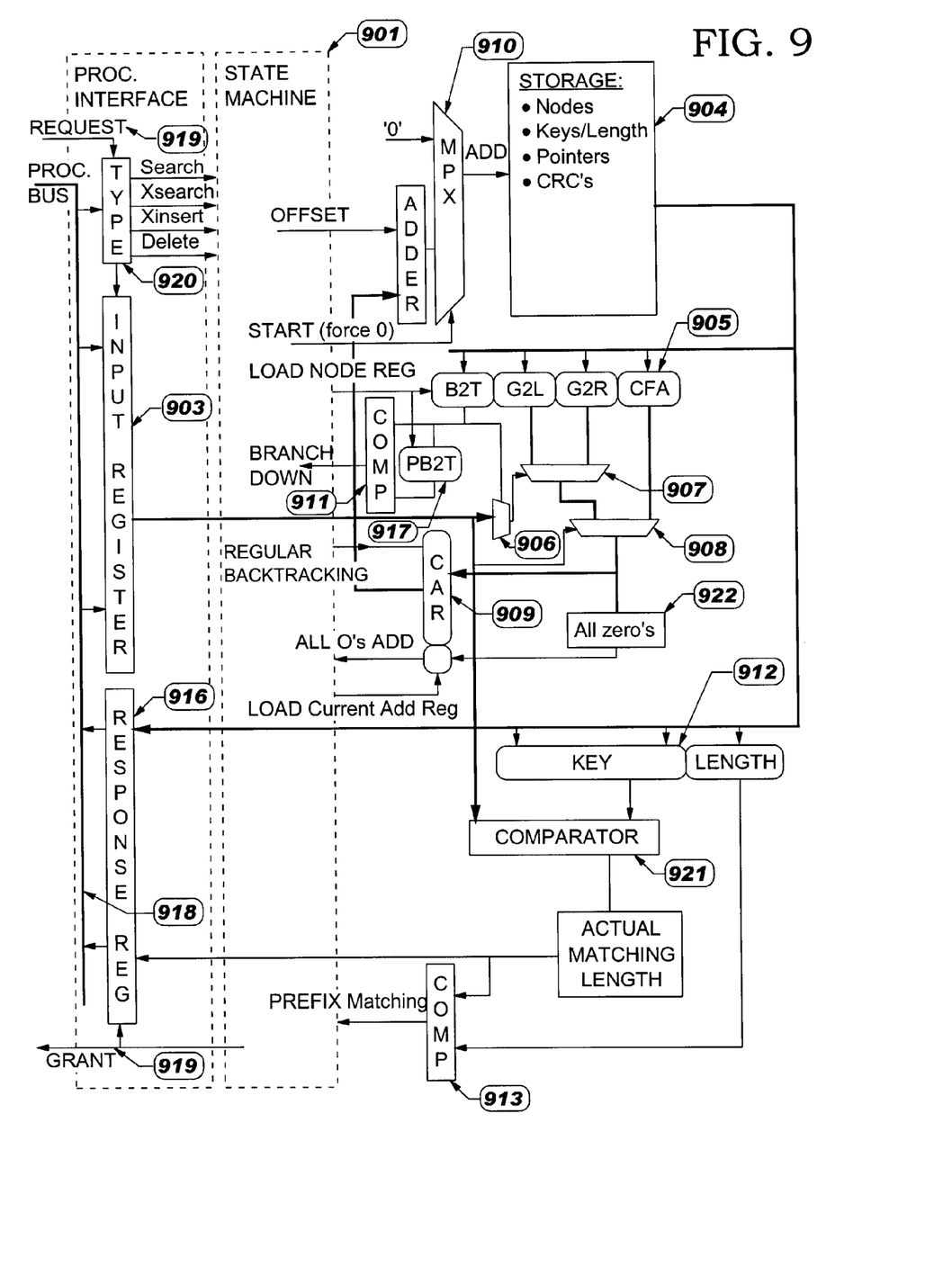
FIG. 9 is a hardware implementation of a searching apparatus according to the invention.

FIG. 9: is the hardware implementation of the searching part of the searching apparatus. Such a searching apparatus can be connected to a processor acting as a controlling device which activates requests (search or delete or insert) towards the searching apparatus and provides input data in the form of variable bit chain keys to be searched or deleted or inserted in the data base. The searching apparatus gives back to the processor a status of completion for delete or insert requests and the data or a pointer to the data as the result of a search request. Usually, the data themselves are not directly managed by the search apparatus; as a matter of fact, the searching apparatus only maintains pointers towards data, the real data base being only accessed by the processor. The searching apparatus can be used in this way with a processor of a network router which reads the IP address of a datagram and requests a search to find the correct pointer to the routing address to be read in the routing table.

The searching apparatus includes a processor interface for communication with the processor. This processor interface comprises a processor bus (918) for input data (input key for any request, a pointer or data to be stored for an insert request) output data (pointer value, status), signals (919) for starting execution of a request or for advising of search completion and three registers. A first register stores the type of request (920), an input register for storing input bit chain (903) and other inputs (pointer for insert request) and a response register (916) for output data to be sent back to the processor. On this interface, the man skilled in the art can choose the best protocol adapted to the processor type for communication between the processor and the searching apparatus.

In order to simplify FIG. 9, only the components necessary for performing the search request have been represented in this implementation of the searching apparatus. Some other components are added to perform the delete and insert functions as described in FIG. 5 and FIG. 7. From a communication point of view, when activating a search request the processor provides an input key (bit chain) on the data bus (918) to the searching apparatus and is given back a status (abend or end of request) or a pointer back (or a bit chain) to find the address having the longest matching prefix with the input bit chain. When activating a delete request the processor provides an input key on the data bus (918) to the searching apparatus and is given back a status (abend or end of request). For an insert request the processor provides an input key and a pointer value (or a bit chain) to be stored on the data bus to the searching apparatus and is given back a status (abend or end of request execution). No pointer (or bit chain) is given back to the processor in the case of these two last requests.

The search request components described in FIG. 9 form a first group, one data flow cycle performed in that group corresponding to a single displacement in the logical tree from one node to the other. It is noted that this displacement will be either down a branch of the tree (regular displacement) or up from the branch of the tree (backtracking displacement). The searching apparatus of FIG. 9 comprises a state machine (901) which triggers auxiliary hardware components described hereunder using a clocked logic. At the beginning of the search, address 0, for the root of the tree, is sent from the state machine (901) thru a multiplexor (910) providing that same address 0 as output. This address 0 at the beginning of the search becomes the current address node in the tree; it is sent thru a bus to an internal storage (904) containing a single storage slot for each logical node of the tree. As illustrated in FIG. 4, each slot comprises a bit chain key (padded on the right) and its prefix length, pointers, CRC's and node connection addresses (so called Node data in FIG. 4) G2L (go to left), G2R (go to right) and CFA (coming from address). The content of the current address node (zero when the search begins) is read from storage to a node register (905) which contains from left to right the bit to test ( B2T) which is comprised between 1 and 32 (on 4 bits) in the case of IPV4. This bit to test is compared using a comparator (911) to the preceding bit to test stored in a register (917). When the search begins no other bit to test has been read and the output of comparator (911) is still B2T. B2T is entered on one leg of a multiplexor (906) the other leg being the padded key value and the output, the value of the bit to test in the padded key. Simultaneously, the current bit to test B2T is stored in the register (917) for next test with the comparator (911). The latter value when multiplexed in one other multiplexor (907) with G2R and G2L addresses of node register (905) results in the next node address of the tree. The result of the next multiplexor (908) getting the result of previous multiplexor on one leg, will result in the CFA address from node register (905), entered on the other leg, only if the 'backtracking' state has been set by the state machine (901). If not, and it is the case when the search begins, the state machine has set the 'regular' state; in this case, the displacement in the tree is up-down, the result of multiplexor (908) is the next node address which is the output of the previous multiplexor (907). The address read in the last multiplexor (908) becomes the current address for the next displacement in the tree. This address is simultaneously loaded in a current address register (909) and compared to all zero address in a comparator (922). The search ends with 'no match found' status if all zero specific address in the tree has been reached. The all zero address is a dummy address conventionally stored as pointing address in the node corresponding to the end of tree (no branching) or conventionally stored as the CFA in the rot. If all zero address is not found, a new cycle in the group of component for node displacement is performed the current address to be read being the current address stored in the current address register (909).

The current address is the input of the multiplexor (910) for pointing to the corresponding storage node slot (904). The data is read in the node register (905) and the B2T is compared in the corresponding comparator (911) to the B2T of the previous explored node stored in the corresponding register (917). If the rank of the previous bit to test is greater than the rank of the current bit to test, the cycling goes on and the bit to test in the input bit chain key is selected thru the corresponding multiplexor (906). As we are still in regular state, the G2L or G2R address is selected (907) and stored in the current address register (909) if not all zero (922). The data flow cycle corresponding to a up down displacement restarts at the current address stored in the current address register (909). The up-down displacement in the tree will stop if no match is found while the all zero address is found (922). Or if the result of the comparator (911) between current and previous bit two test shows that the next B2T is greater or equal to the previous B2T. This means that the end of a branch of the tree has been reached and that the next displacement will be down-up. The state machine (901) sets the backtracking state as input leg for the multiplexor 908. This means that when the next data flow cycle which will be initiated by the state machine (901), for the data flow in the group of components used for calculating the displacement in the tree, the next current address selected in the corresponding multiplexor (908) will be the CFA address.

When backtracking state is set, the data flow is a second group of components is performed to test the matching prefix of the key stored at the current address in the tree. The state machine triggers the loading of a key register (912) with the key stored at the current address using an offset applied as an input to the adder in front of the corresponding multiplexor (910) pointing to the current address. In a comparator (921), the just read key is compared with the input key. The actual matching length between the keys is then compared in a comparator (913). If the prefix matching line, output of the comparator, is asserted, the longest matching prefix has been reached and the searching process stops: the status is sent back to the state machine (901) which sends a signal of end of search (919) and adds an offset to the current address in the node slot of the internal storage (904) in order to have the pointers address to be stored in the response register (916). These pointers are given back to the processor having requested a searching operation thru the processor interface described above. If the prefix matching line, output of the comparator, is not asserted, the longest matching prefix has not yet been reached. The state machine triggers a new down-up displacement in backtracking state to reach a new address in the tree. At each down-up displacement in backtracking state in the tree, after one cycle of data flow in the group of components for displacement in the tree, one cycle is performed in the second group of components for testing the actual matching length between the key stored and the input key. The process ends when the longest matching prefix is found or next address is all zero this means the root of the end of tree has been reached.

The searching apparatus as described in FIG. 9, in order to perform the insert and delete operations, further comprises a LIFO (last in first out) stack, part of its internal storage (904), in order to keep track of the unused node address in the internal storage. When a delete is performed, the state machine triggers putting back the spare node address on top of the stack for being reused with the next insert operation.

As an example, a hardware implementation of a searching apparatus according to the invention may comprise a 100 MHz 16 Mbits SDRAM (Synchronous dynamic random access memory, an industry standard low cost component) used as the internal storage (904), a FPGA (field programmable gate array) able of interfacing at a 10 ns cycle the storage unit (904) and a sufficient number of logical blocks to implement the multiplexors and registers, etc. described above. This hardware apparatus will have a capacity of 64K nodes storing variable bit chains of up to 144 bits (this key length is greater than the keys for IPv6 datagrams which are 128 bit length) and a typical searching time in a full extended patricia tree of 2 $\mu$s corresponding to 500 000 searching operation per second (average). The internal storage (904) is represented in FIG. 4: 64k nodes, 144 bit keys and a 16 Mbits storage. The invention has been described in terms of preferred embodiments, those skilled in the art will recognize that the invention can be practiced with modifications within the spirit and the scope of the appended claims.

What is claimed is:

1. A method for searching input variable bit chain keys having a maximum length value, in a Patricia tree based data base, each node in the data base storing a direct parent address pointing to a previous node, two addresses pointing to following nodes, a data value or a pointer to a data value, a bit chain key zero padded up to said maximum length value, the length of said key and the rank of a bit to be tested at this node in the input key; said method comprising the steps of:

A. pointing to a root node of the tree,
B. padding the input key with zeros up to the maximum length value and reading the bit to test in the input key and according to the value of the bit to test pointing to the following node address,
C. repeating step B and reaching the following nodes until the rank of the bit to test of a following node is equal to or greater than the rank of the bit to test of the previous node, the previous node thereby becoming a terminating node,
D. comparing the key stored in said terminating node on its stored length with the zero padded input key,
E. if a match is found in step D, terminating the search,
F. if a match is not found in step D, pointing to the parent node of the terminating node using the direct parent address, the parent node thereby becoming a new terminating node, and
G. repeating steps D, E and F until the root node is reached or a match is found in step D.

2. A method for searching input variable bit chain keys having a maximum length value, in a Patricia tree based data base, each node in the data base storing a direct parent address pointing to a previous node, two addresses pointing to following nodes, a data value or a pointer to a data value, a bit chain key zero padded up to said maximum length value, the length of said key and the rank of a bit to be tested at this node in the input key; said method comprising the steps of:
A. pointing to a root node of the tree,
B. padding the input key with zeros up to the maximum length value and reading the bit to test in the input key and according to the value of the bit to test pointing to the following node address,
C. repeating step B and reaching the following nodes until the rank of the bit to test of a following node is equal to or greater than the rank of the bit to test of the previous node,
D. comparing the key stored in said previous node on its stored length with the zero padded input key,
E. if a match is not found, pointing to the parent node using the direct parent address,
F. repeating step E until the root is reached or a match is found,
G. reading the pointer or the data value of said previous node,
H. performing the searching steps according to the method of claim 1 up to step C,
I. inserting a new node between the previous node and the following node and storing in the new node the input key and the input key length,
J. comparing the length of the key of the just reached node with the length of the key of its parent node,
K. if the length of the parent node key is smaller than the length of the key to be inserted, comparing the key of the just reached node on its key length with the key of its parent node,
L. if a match is found, swapping the two key values between the just reached node and its parent node while restoring the node branching;
M. repeating steps I to K until the root is reached.

3. A method of searching a patricia tree for a match on an variable length input key, wherein the input key has a maximum bit lenght, each node in the tree containing a pointer to its parent node, pointers to two child nodes, a data value or a pointer to a data value, a bit key padded with zeros up to the maximum bit length, a prefix length of the bit key and a rank value that identifies a bit to be tested at that node in the input key, comprising
 a) padding the input key up to the maximum bit length,
 b) pointing to the root node as the present node,
 c) testing a bit in the input key identified by the rank value stored in the present node,
 d) pointing to one of the child nodes of the present node according to the value of the bit tested in step c), the child node thereby becoming a new present node,
 e) repeating steps c) and d) until the rank value stored in the present node is equal to or greater than that of a parent node of the present node,
 f) pointing to one of the child nodes of the present node according to the value of the bit tested in the input key, the child node thereby becoming a new present node,
 g) comparing the prefix of the key specified by the prefix length, both the key and the prefix length being stored in the present node, with the same prefix of the input key,
 h) if the comparison of step g) matches, terminating the search,
 I) if the comparison of step g) does not match, pointing to the parent node of the present node, the parent node thereby becoming a new present node,
 j) comparing the prefix of the key specified by the prefix length stored in the present node with the same prefix of the input key,
 k) if the comparison of step j) matches, terminating the search,
 l) if the comparison of step j) does not match, pointing to the parent of the present node as the next present node,
 m) repeating steps j), k) and l) until a match is found at step j) or until the tree is exhausted.

4. The method of claim 3 for inserting a node further comprising
 performing steps a) through f) of claim 3,
 inserting a new node having a key equal to the input key between the present node and the parent of the present node by adjusting the parent node pointers and child node pointers of the present node, the parent node and the inserted node,
 pointing to the inserted node as the present node,
 beginning with the inserted node and proceeding up the tree towards the root node, comparing the lengths of the keys of adjacent nodes,
 if the length of the key of the node closest to the root node is longer than the length of the key of the node below it in the tree, exchanging the stored keys and the prefix lengths of the adjacent nodes and updating the parent and child pointers.

5. A method of searching a patricia tree for a match on an variable length input key, wherein the input key has a maximum bit length, each node in the tree containing a pointer to its parent node, pointers to two child nodes, a data value or a pointer to a data value, a bit key padded with zeros up to the maximum bit length, a prefix length of the bit key and the rank of a bit to be tested in the input key, comprising a) padding the input key up to the maximum bit length,
b) pointing to the root node as the present node,
c) testing the bit in the input key according to the rank stored in the present node,
d) pointing to one of the child nodes of the present node as the next present node according to the value of the bit tested in step c),
e) repeating steps c) and d) until the rank of the bit to test in the input key specified by the present node is equal to or greater than that of its parent node,
f) pointing to one of the child nodes of the present node as the next present node according to the value of the bit tested in the input key,
g) inserting a new node having a key equal to the input key between the present node and the parent node of the present node by adjusting the parent node pointers and child node pointers of the present node, the parent node and the inserted node,
h) pointing to the inserted node as the present node,
i) comparing the length of the key of the present node with the length of the key of its parent node,
j) if the length of the key of the parent node is smaller than the length of the present node, comparing the prefix of the key of the present node with the prefix of the key of the parent node,
k) if the prefix of the key of the present node equals the prefix of the key of the parent node, exchanging (FIG. 6–112) the key values and the prefix lengths of the inserted node and the parent node and updating the node branching,
l) pointing to the parent of the present node as the new present node, and
m) repeating steps i through l until the root node of the tree is reached.

* * * * *